US012758900B2

(12) United States Patent
Sams et al.

(10) Patent No.: US 12,758,900 B2
(45) Date of Patent: Oct. 13, 2026

(54) EMULSION DETECTION IN ELECTRICAL SEPARATORS

(71) Applicant: Cameron International Corporation, Houston, TX (US)

(72) Inventors: Gary W. Sams, Spring, TX (US); Juan C. Alvarez, Houston, TX (US)

(73) Assignee: Cameron International Corporation, Houston, TX (US)

( * ) Notice: Subject to any disclaimer, the term of this patent is extended or adjusted under 35 U.S.C. 154(b) by 119 days.

(21) Appl. No.: 18/921,259

(22) Filed: Oct. 21, 2024

(65) Prior Publication Data

US 2025/0041763 A1 Feb. 6, 2025

Related U.S. Application Data

(62) Division of application No. 17/653,573, filed on Mar. 4, 2022, now Pat. No. 12,121,830.

(60) Provisional application No. 63/200,423, filed on Mar. 5, 2021.

(51) Int. Cl.

| | |
|---|---|
| ***B01D 17/12*** | (2006.01) |
| ***B01D 17/04*** | (2006.01) |
| ***B01D 17/06*** | (2006.01) |
| ***C10G 33/02*** | (2006.01) |
| ***G01N 27/07*** | (2006.01) |

(52) U.S. Cl.
CPC ............ *B01D 17/12* (2013.01); *B01D 17/04* (2013.01); *B01D 17/06* (2013.01); *C10G 33/02* (2013.01); *G01N 27/07* (2013.01)

(58) Field of Classification Search
CPC ................................ B01D 17/12; B01D 17/06
See application file for complete search history.

(56) References Cited

U.S. PATENT DOCUMENTS

| | | | | |
|---|---|---|---|---|
| 3,205,160 | A | 9/1965 | Stenzel | |
| 3,841,483 | A | 10/1974 | Overton | |
| 3,933,606 | A * | 1/1976 | Harms | C02F 1/46104 205/743 |
| 4,031,007 | A | 6/1977 | Sierra, Jr. | |
| 4,033,851 | A | 7/1977 | Oros | |
| 12,121,830 | B2 | 10/2024 | Sams | |
| 2016/0060546 | A1 | 3/2016 | Collins, Jr. | |
| 2017/0321412 | A1 | 11/2017 | Peters | |
| 2019/0135661 | A1 * | 5/2019 | Ellers | C02F 1/463 |

* cited by examiner

*Primary Examiner* — Brian W Cohen
(74) *Attorney, Agent, or Firm* — Kyle R. Miiller

(57) ABSTRACT

Electrical separators employing detection of conductive fluid excursions are described herein. A separator of this type has a separator, comprising a separation vessel; an electric field assembly extending a first distance within the separation vessel in a first direction of a density-based separation force; a plurality of detector electrodes extending a second distance within the separation vessel in the first direction; one or more power units; and one or more circuits electrically coupling the electric field electrodes and the detector electrodes with the one or more power units.

13 Claims, 8 Drawing Sheets

EMULSION DETECTION IN ELECTRICAL SEPARATORS

CROSS-REFERENCE TO RELATED APPLICATION

This application is a divisional application of U.S. patent application Ser. No. 17/653,573, filed Mar. 4, 2022, now U.S. Pat. No. 12,121,830, which claims priority to and the benefit of U.S. Provisional Application No. 63/200,423, filed Mar. 5, 2021, which are incorporated by reference herein in their entirety for all purposes.

FIELD

Embodiments of the present invention generally relate to electrical and mechanical separation of separable liquids. Specifically, methods and apparatus for preventing loss of control over separation interfaces in electrical separators are described herein.

BACKGROUND

Oil/water separation is common in the hydrocarbon industry. In hydrocarbon recovery operations, water is commonly used to carry solids and liquids into and out of equipment and reservoirs for various purposes. The water frequently comes into contact with hydrocarbons such as oil, and can become intermingled with the hydrocarbon. When the operation is finished, water with hydrocarbon cannot be discharged to the environment without first removing the hydrocarbon, and oil cannot be transported without first removing water.

Separations are typically performed to separate the hydrocarbon from the water. As is commonly known, oil typically separates from water naturally. However, complete removal of water from oil can be hindered by surfactants, temperature, and oil viscosity. The properties of the oil and the water influence how quickly and completely the separation occurs. For example, in most cases oil will form an emulsion with water that can take some time to separate. The time required for water droplets dispersed in oil to diffuse and coalesce together depends on chemical and physical properties of the oil and water, droplet size of the water in the oil, and relative amounts of oil and water in the emulsion. Without the aid of any separation technology, water droplets and/or solid particles 100 microns in size normally require 30 minutes or more to separate adequately from oil.

Many technologies are therefore used to separate separable liquids, and solids from liquids, effectively and efficiently. Electrical separation is one technique. A multi-phase mixture is charged to a vessel, and an electric field is established inside the vessel to encourage materials with different electrical properties to separate faster. Application of the electric field increases the rate of separation beyond the base level of gravitational separation.

Operators continue to seek lower costs, higher throughput operations, and electrical separation is no exception. As throughput increases in electrical separators, movement of fluid interfaces within the separator becomes more variable, and the location of highly conductive interface layers can change rapidly. With such regimes, risk increases that a highly conductive interface layer might come into electrical contact with a powered electrode disposed within the separation vessel, potentially damaging the electrical equipment. There is a need for fast, reliable ways to detect incipient or imminent contact between highly conductive fluids and electrodes within an electrical separator.

SUMMARY

Embodiments described herein provide a separator, comprising a separation vessel; an electric field assembly extending a first distance within the separation vessel in a first direction of a density-based separation force; a plurality of detector electrodes extending a second distance within the separation vessel in the first direction; one or more power units; and one or more circuits electrically coupling the electric field electrodes and the detector electrodes with the one or more power units.

Other embodiments provide an electrical separator, comprising a separation vessel; an electric field assembly disposed within the separation vessel to form an electric field within the separation vessel; and a conductivity detector disposed within the separation vessel to detect conductive fluid within the separation vessel before the conductive fluid can reach the electric field assembly.

Other embodiments provide a method of separating phases of a multiphase fluid into two liquid phases, the method comprising providing the multiphase fluid to a separation vessel having an electrode disposed in an interior of the vessel; applying power to the electrode within the vessel to create an electric field within the multiphase fluid; disposing an electrical conductivity detector within the interior of the vessel at a location selected to enable detection of an electrical conductivity of a fluid portion in the separation vessel before the fluid portion affects the electrode; applying power to the electrical conductivity detector using a power unit electrically coupled to the electrical conductivity detector; monitoring operation of the power unit to detect operating changes in the power unit that can be related to a change in electrical conductivity of fluid near the electrical conductivity detector; and controlling operation of the separator or the electrode to reduce electrical conductivity of the fluid near the electrical conductivity detector.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

New electrical separation apparatus and methods are described herein. The new apparatus and methods use electric field electrodes to form an electric field within a separation vessel of a separator, and detector electrodes to detect any encroachment of conductive fluids before such fluids contact the electric field electrodes. The detector electrodes are positioned within the separation vessel such that as a conductive fluid encroaches, the conductive fluid will contact the detector electrodes before contacting the electric field electrodes. In general, the detector electrodes and the electric field electrodes may be powered by one or more power units, and may be electrically coupled to the one or more power units by one or more circuits. For example, the detector electrodes and the electric field electrodes may use the same power source, and may be connected to the single power source by one circuit. Alternately, the detector electrodes may have a dedicated power unit.

Figure 1:
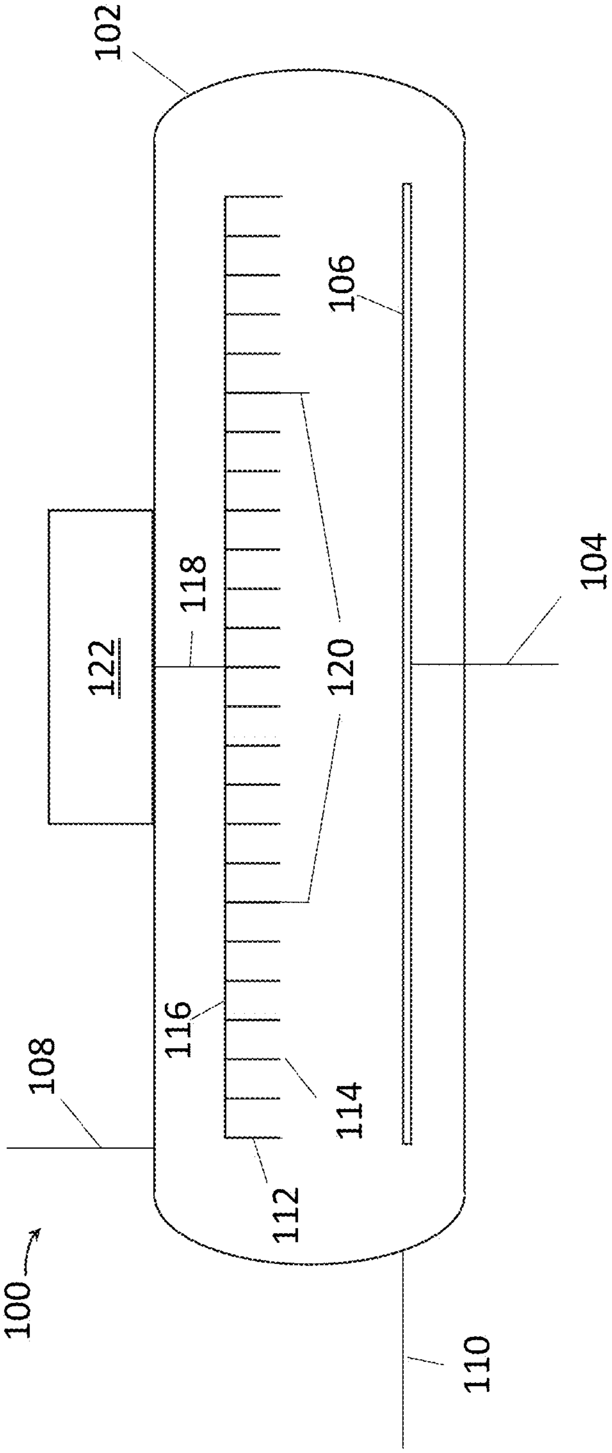
FIG. 1 is a schematic internal side view of a separator according to one embodiment.

FIG. 1 is a schematic internal side view of a separator 100 according to one embodiment. The separator 100 has a separation vessel 102, in which a multiphase fluid having two or more separable liquid phases is separated into two separate liquids. An inlet 104 charges the multiphase fluid to the vessel 102, in this case using a fluid distributor 106 fluidly coupled to the inlet 104 and positioned in a lower part of the vessel 102. Separated liquid phases are withdrawn through a first outlet 108 and a second outlet 110, located at convenient locations to withdraw the separate liquids.

An electrode array 112 is disposed in the interior of the vessel 102. The electrode array 112 has a plurality of electrodes 114 coupled to a support 116 and electrically coupled to a circuit 118. The circuit 118, support 116, and electrodes 114 constitute an electric field assembly for the separator 100. The electrodes 114 all extend from the support 116 into the vessel interior a first distance, which is substantially equal for all the electrodes 114. The electrode array 112 has a pair of electrodes 120, coupled to the support 116, and extending from the support 116 into the vessel interior a second distance greater than the first distance. The electrodes 114 are a plurality of first electrodes and the electrodes 120 are a plurality of second electrodes, in this case only two electrodes. The circuit 118 is electrically coupled to a power unit 122 to supply power to the electrodes 114 and 120 through the circuit 118. The circuit 118 is shown here as a single line for simplicity, but the circuit 118 typically contains a power conduit and may contain a return or ground path. The power unit 122 may supply substantially constant, or time-varying, voltage, and the powered electrode array 112 generally creates an electric field within the interior of the vessel 102 to encourage separation of the multiphase fluid. The first electrodes 114 are electric field electrodes for generating an electric field within the separation vessel 102.

Separators like the separator 100 are frequently used to separate mixtures that include hydrocarbon and water. The water can be salty, and is generally conductive to varying degrees, while the hydrocarbon typically has little to no electrical conductivity. The two liquids separate gravitationally into two bulk liquid phases, with a boundary between them. The separator 100 is typically operated such that the electrode array 112 remains immersed in the hydrocarbon phase. If conductive material within the vessel 102 contacts two or more of the first electrodes 114, a short circuit can develop that can damage the power unit 122. For this reason, the separator 100 is typically operated to maintain the location of the phase boundary away from, in this case below, the electrodes 114.

The liquid phases can develop a stable mixture near the phase boundary that can be highly conductive due to presence of water, which can have high salinity, and solids. The stable mixture has the effect of increasing the size of the phase boundary, and the size of the stable mixture can change with changing process and fluid conditions. While known technologies can be used to ascertain the size and location of the stable mixture, these technologies may not resolve the size and location of the stable mixture quickly and accurately at all times. For this reason, the second plurality of electrodes 120 are conductivity detectors. Because the second plurality of electrodes 120 extends further into the interior of the vessel 102, the second electrodes 120 will detect any conductive material rising in the vessel 102 before the first electrodes 114 contact the conductive material. As conductive material encroaches on the electrode array 112, the second electrodes 120 will be affected by the encroaching material before the first electrodes 114, so the second electrodes 120 will experience electrical changes that are not experienced by the first electrodes 114. The power unit 122 will exhibit operating changes as the second electrodes 120 experience changes in electrical conditions. Thus, as the fluid around the second electrodes 120 increases in conductivity, the power unit 122 can be monitored for changes in operating conditions to trigger control action to increase space between the conductive fluids and the electrode array.

In this case, the second electrodes 120 are longer than the first electrodes 114. All the electrodes of the array 112 extend from the support 116 in this case, but in other cases an extension can be used to attach each electrode of the array 112 to the support 116. In such cases, the electrodes of the array 112 can all be the same size, and the length of the support can be varied, or location of the electrode on the support can be varied, to vary the extension distance of the electrodes.

Figure 2:
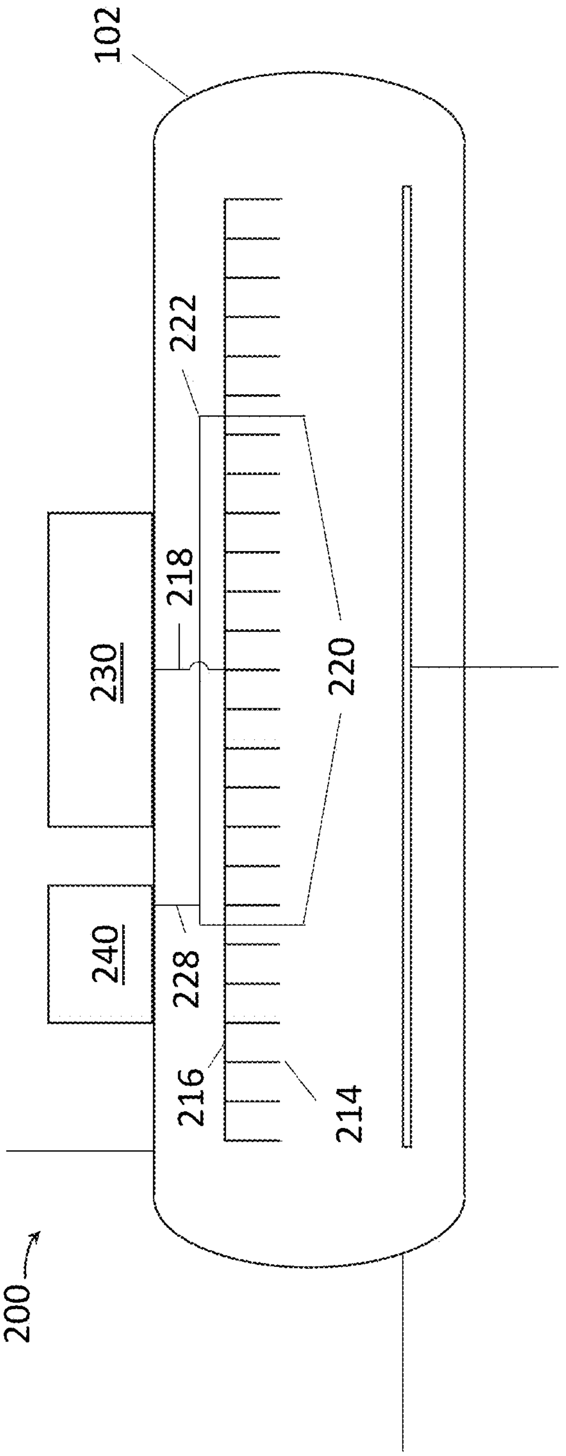
FIG. 2 is a schematic internal side view of a separator according to another embodiment.

FIG. 2 is a schematic internal side view of a separator 200 according to another embodiment. In this embodiment, the separation vessel 102 has a plurality of first electrodes 214 and a plurality of second electrodes 220. The first electrodes 214 are attached to a first support 216 and the second electrodes 220 are attached to a second support 222. The second electrodes 220 and second support 222 constitute a conductivity detector of the separator 200. A first circuit 218 couples the first electrodes 214 to a first power unit 230 and a second circuit 228 couples the second electrodes 220 to a second power unit 240. Here, the first electrodes 214 are electric field electrodes and the second electrodes 220 are detector electrodes, as described above in connection with FIG. 1. The first electrodes 214, first support 216, and first circuit 218 constitute an electric field assembly for the separator 200. In this case, the first power unit 230 applies power to the first electrodes 214 to perform fluid separation by generating an electric field within the separation vessel 102, while the second power unit 240 powers the second electrodes 220 to detect proximity of conductive material. In this case, the second power unit 240 is specified at a capacity useful for detecting the presence or approach of conductive material. Thus, the capacity of the second power unit 240 may be lower than the capacity of the first power unit 230. For example, the second power unit 240 may operate at a lower voltage than the first power unit 230. In some cases, the second power unit 240 is tuned to operate with power parameters selected to maximize sensitivity to changes in fluid conductivity around the second electrodes 220, or to maximize signal-to-noise in measuring an electrical characteristic, such as voltage, current, impedance, or phase, in the second circuit 228. In such cases, the first power unit 230, having operating parameters for efficiently separating fluids in the separator 200, may operate according to different parameters and controls than the second power unit 240.

The detector electrodes can be placed at any location within the separation vessel. If there is a known location within the separation vessel where conductive fluid approaches an electrode array disposed within the separation vessel, detector electrodes can be placed near the known location as an early warning about the growth, rise, or encroachment of conductive material. In some cases, the detector electrodes form a conductivity detector that is disposed within the separator. The conductivity detector can be a distributed array of electrodes arranged to detect a distribution of conductivity readings over an area. The electrodes of the array may be coupled together electrically to have the same electric potential, or the electrodes of the array can be coupled together using circuitry to influence the collective operation of the electrodes as a conductivity detector. In some cases, the conductivity detector can be operated to resolve a conductivity map or an isovoltaic map within the separation vessel.

Figure 3:
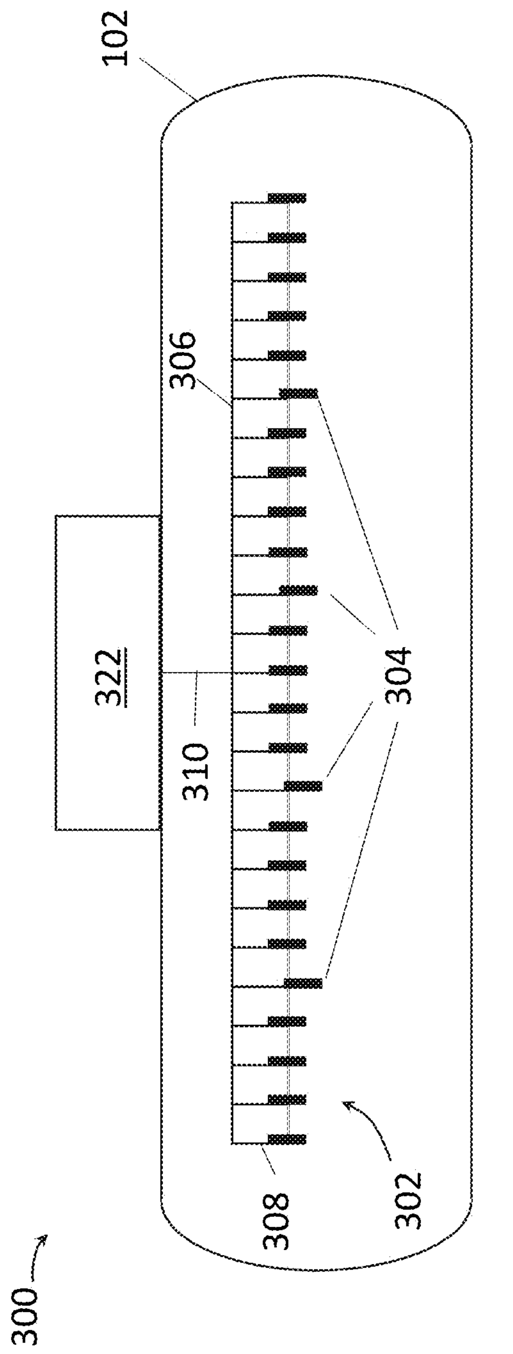
FIG. 3 is a schematic internal side view of a separator according to another embodiment.

FIG. 3 is a schematic internal side view of a separator 300 according to another embodiment. The inlet and outlet conduits are omitted from FIG. 3 for simplicity, but the separator 300 has suitable inlet and outlet fluid conduits. The separator 300 has an electric field assembly comprising an electric field array 302, a support 306, and a circuit 310 that connects the electric field assembly to a power unit 322. The electric field array 302 is a plurality of first electrodes, disposed within the separation vessel 102. A conductivity detector 304, in this case a plurality of second electrodes, is also disposed within the vessel 102. Here, each of the electrodes 302 and 304 is attached to the support 306 by a respective leg 308, so that a plurality of first legs are used to attach the first electrodes 302 to the support 306 and a plurality of second legs are used to attach the second electrodes 304 to the support 306.

The first legs have the same length in the separator 300, while the second legs have different lengths. The first electrodes 302 thus all have the same elevation within the separation vessel 102, while the second electrodes 304 have different elevations. The first electrodes 302 thus extend into the separation vessel 102 by a first distance, which is the same for all the first electrodes 302, while the second electrodes 304 extend into the separation vessel 102 by a plurality of second distances, all different from the first distance. Locating the second electrodes 304 at different locations, elevations, extension distances within the vessel 102 provides conductivity detection at different elevations and proximities. Here, the second electrodes 304 are shown spaced at regular intervals, where every fifth electrode is a detection electrode, but the second electrodes 304 may be deployed according to any desired pattern and any desired distribution of elevations. The second electrodes 304 can form a three-dimensional distributed conductivity detector within the separation vessel 102.

Figure 4A:
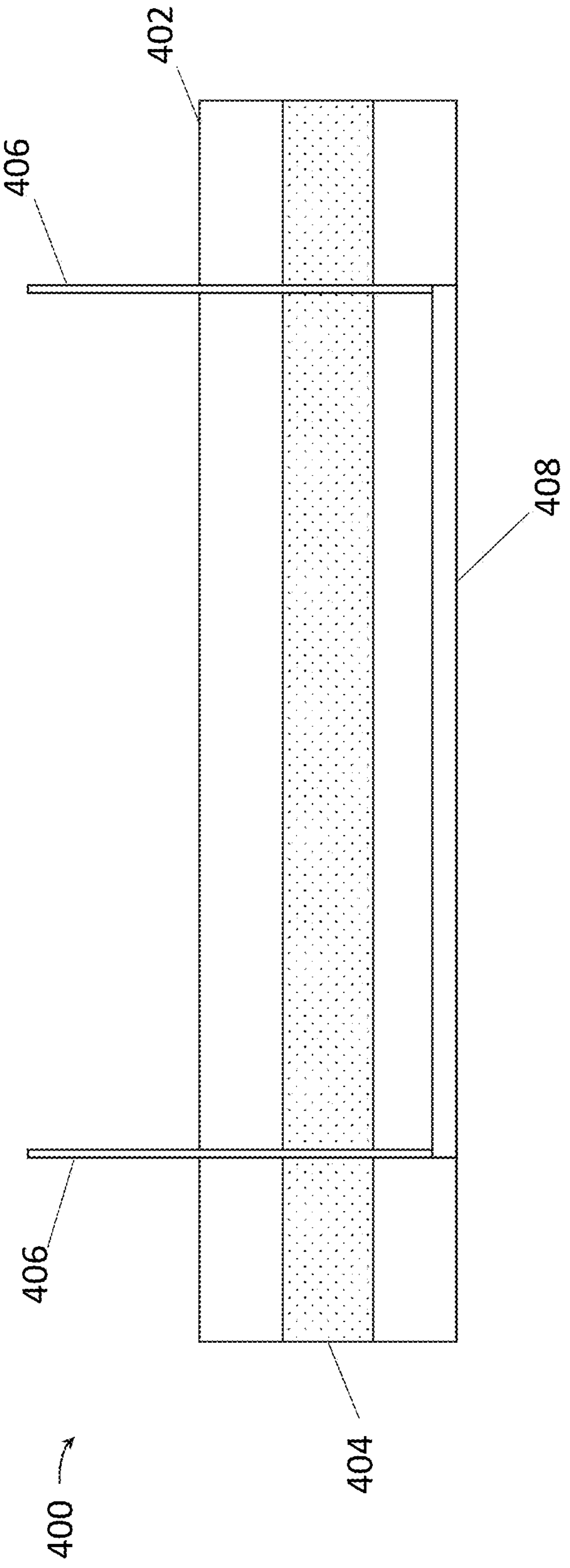
FIG. 4A is a schematic elevation view of an electrode assembly according to one embodiment.

FIG. 4A is a schematic elevation view of an electrode assembly 400 according to one embodiment. The electrode assembly 400 can be used in an electrical separator of the types described herein. Such electrical separators may have a plurality of electrode assemblies like the electrode assembly 400.

The electrode assembly 400 has a plate support 402 that supports a sheet electrode 404. The sheet electrode 404 is made of a conductive material, such as graphite, and is adhered to the plate support 402. For example, the sheet electrode 404 may be adhered to the plate support 402 using an adhesive substance. The plate support 402 is made of a structurally strong material, which may be conductive or non-conductive. Steel or ceramic can be used, for example. Where the plate support 402 is conductive, the sheet electrode 404 may be insulated from the plate support 402, for example by applying a non-conductive coating (i.e. polymer coating) between the plate support and the sheet electrode 404.

The electrode assembly 400 includes one or more arm supports 406. In this case, there are two arm supports 406, but there may be any number of arm supports 406. The arm supports 406 facilitate attaching the electrode assembly 400 to a support within a separation vessel, as described elsewhere herein. The arm supports 406 may also serve as power conduits carrying power to the sheet electrode 404. The arm supports 406 are shown here extending across a width of the plate support 402 from one side thereof to an opposite side thereof, but the arm supports 406 can be attached to the plate support 402 in any convenient configuration. For example, the arm supports 406 can extend halfway across the plate support 402, from one side of the plate support 402 to a centerline of the plate support 402. In other cases, the arm supports 406 can be attached to the edge of the plate support 402.

In some cases the sheet electrode 404 is covered by a protective coating to prevent chemical or thermal degradation of the sheet electrodes 404. In such cases, the sheet electrode 404 itself is not as effective for use as a conductivity detector since the sheet electrode 404 will not come into direct contact with fluids in the vicinity. The electrode assembly 400, thus, also has a detector electrode 408 to serve as a conductivity detector. The detector electrode 408 can be attached to the plate support 402 or to one or more of the arm supports 406 and can be disposed at any convenient location. In many cases, as shown here, the sheet electrode 404 will be disposed in a central area of the plate support 402 while the detector electrode 408 is disposed in a peripheral or edge area of the plate support 402 to provide spatial separation between the sheet electrode 404 and the detector electrode 408 for early detection of encroaching conductive fluids. The detector electrode 408 receives power like the sheet electrode 404, through power conduits electrically coupled to the detector and sheet electrodes 408 and 404. The power conduits may deliver power from one power unit to all the electrodes of the electrode assembly 400, or from different power units dedicated to respective electrodes of the electrode assembly 400.

It should be noted that, whereas one sheet electrode 404 and one detector electrode 408 are shown here, the electrode assembly 400 can have any number of sheet electrodes 404 and any number of detector electrodes 408 arranged in any convenient arrangement. Additionally, here there is one plate support 402 attached to two arm supports 406, but an electrode assembly 400 can have multiple plate supports 402 distributed according to any convenient arrangement, for example multiple parallel plate supports distributed at uniform distances, each bearing sheet and/or detector electrodes. It should also be noted that, whereas the detector electrode 408 is shown here attached to the arm supports 406, the detector electrode 408 can be spaced apart from the arm supports 406. For example, a detector electrode can be located at a lowest extremity of the plate support 402 having no direct contact with an arm support. It should also be noted that the sheet electrode 404 and detector electrode 408 can receive power directly through the arm supports as power conduits, so the arm supports 406 can be made of conductive or non-conductive material. If the arm supports 406 are non-conductive, cabling can be run along the arm supports 406 to power the sheet electrode(s) 404 and the detector electrode(s) 408.

Figure 4B:
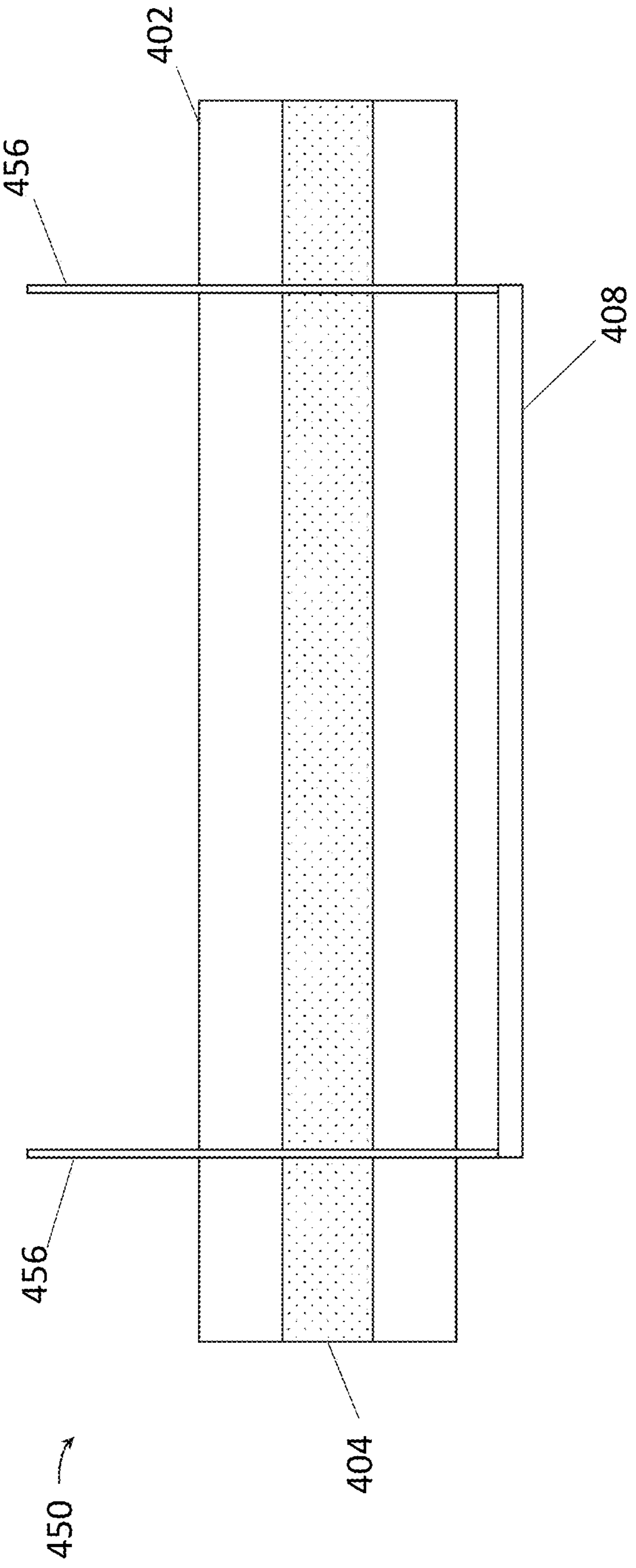
FIG. 4B is a schematic elevation view of an electrode assembly according to another embodiment.

FIG. 4B is a schematic elevation view of an electrode assembly 450 according to another embodiment. The electrode assembly 450 is similar to the electrode assembly 400. The electrode assembly 450 has arm supports 456 that extend away from both opposite sides of the plate support 402 such that both ends of each arm support 456 can be used to attach objects. In this case, one end of each arm support 456, both on the same side of the plate support 402, is attached to the detector electrode 408. In this way, the detector electrode 408 can extend beyond the side of the plate support 402. In this case, the detector electrode 408 is spaced apart from the plate support 402. The configuration of FIG. 4B can be useful for detecting a rise in conductivity before highly conductive fluids contact the plate support 402. Such configurations are useful where the plate support 402 is made of a material, such as fiberglass, that can develop conductivity pathways to the sheet electrode 404 when a conductive fluid contacts the plate support 402. Using a detector electrode 408 spaced apart from the plate support 402 provides the opportunity to prevent conductive fluids from contacting the plate support 402.

Figure 5:
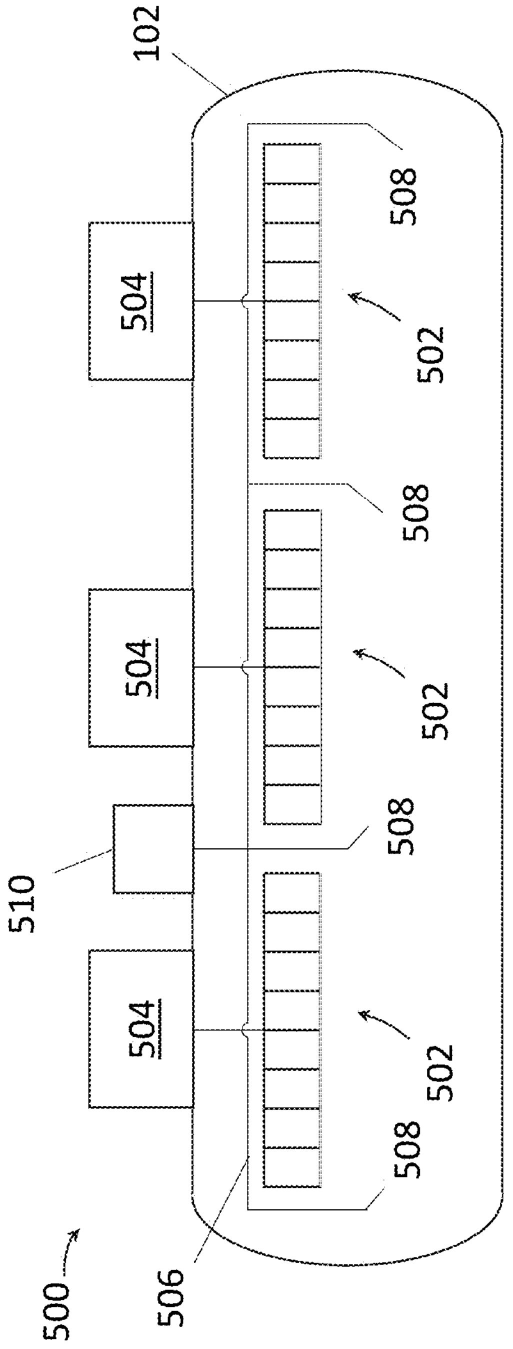
FIG. 5 is a schematic internal side view of a separator according to another embodiment.

FIG. 5 is a schematic internal side view of a separator 500 according to another embodiment. The separator 500 is similar in many respects to the separators 100, 200, and 300. The separator 500, however, has a plurality of electrode arrays 502, each electrode array 502 electrically coupled to a dedicated power unit 504. Fluid inlet and outlet conduits are omitted again in FIG. 5 for simplicity, but the separator 500 has suitable fluid inlet and outlet conduits.

The electrode arrays 502 constitute a plurality of first electrodes that are powered by the power units 504 to create an electric field within the separation vessel 102 to separate multiphase fluids therein. The separator 500 has a conductivity detector 506 that comprises a distributed array of second electrodes 508 for detecting conductivity changes indicating encroachment of conductive material within the separator 500. The distributed conductivity detector 506 is coupled to a detector power unit 510. Here the second electrodes 508 are distributed amongst the electrode arrays 502 such that one or more second electrodes 508 is co-located with each electrode array 502. Such arrangement of detection apparatus provides protection to all the electrode arrays 502 from contacting conductive fluid within the separation vessel 102. Here, the second electrodes 508 come in multiple lengths. That is to say a first portion of the second electrodes 508 is located at a first location, for example a first elevation, within the separation vessel 102 and a second portion of the second electrodes 508 is located at a second location, for example a second elevation, different from the first location, within the separation vessel. The first portion of the second electrodes 508 thus extends a first distance within the interior of the vessel 102 while the second portion of the second electrodes 508 extends a second distance within the interior of the vessel 102, the second distance being larger than the first distance.

Figure 6:
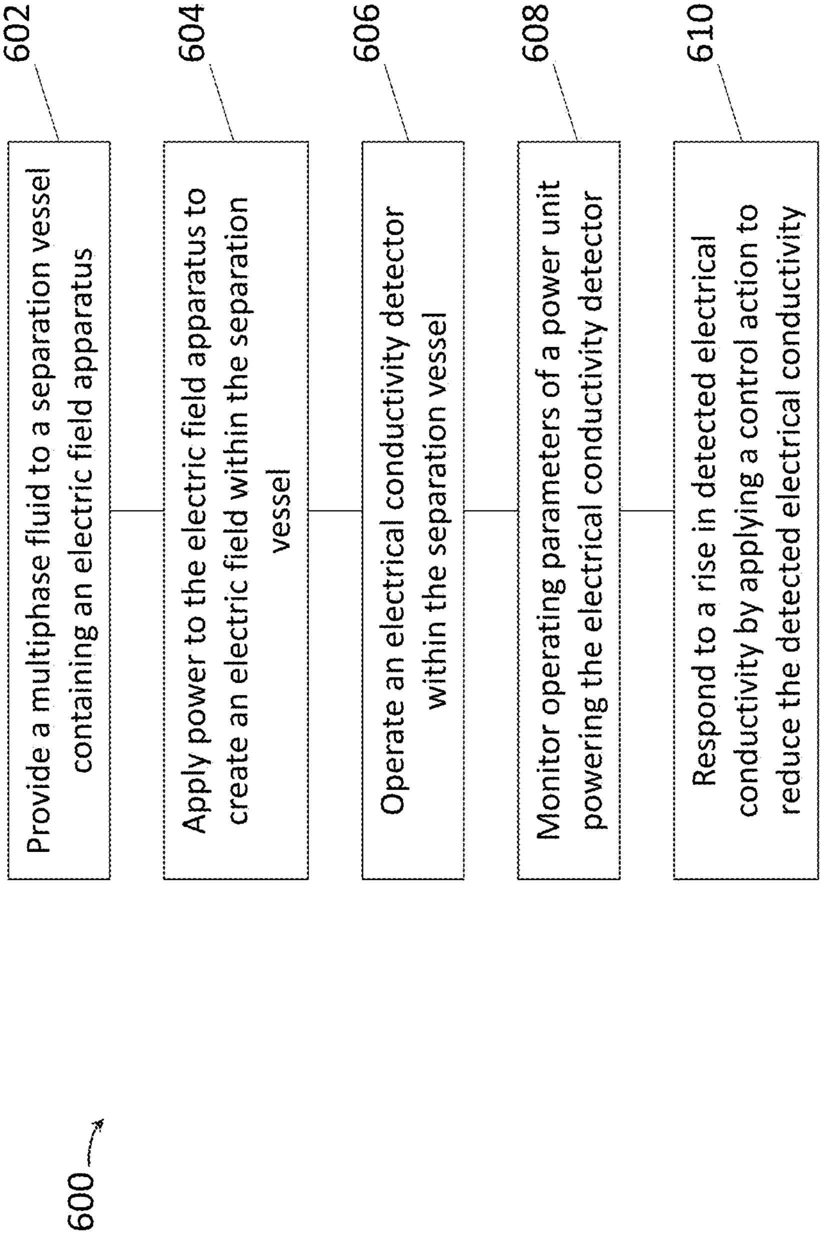
FIG. 6 is a flow diagram summarizing a method according to one embodiment.

FIG. 6 is a flow diagram summarizing a method 600, according to one embodiment. The method 600 is a method of separating phases of a multiphase fluid into two liquid phases. At 602, the multiphase fluid is provided to a separation vessel containing an electric field apparatus. The apparatus may include an array of electrodes, or one single electrode, and the separation vessel is operated such that the electrodes are substantially always surrounded by the multiphase fluid.

At 604, power is applied to the array of electrodes to create an electric field within the separation vessel. The power may take the form of a static voltage or a time-varying voltage. The electric field may have a magnitude, or an average magnitude, of 5 kV to 70 kV, and may have a frequency and/or waveform that is selected to maximize power absorption by the multiphase fluid. The electric field encourages separation of liquids in the multiphase fluid having different electrical characteristics. Two distinct liquid phases are withdrawn from the separation vessel.

At 606 an electrical conductivity detector is disposed within the separation vessel. The electrical conductivity detector may include a single electrode or a plurality of electrodes. The conductivity detector may receive power from the same power unit used to power the array of electrodes described above, or one or more dedicated power units may power the electrical conductivity detector. Where a dedicated power unit is used for the electrical conductivity detector, the power unit may have a capacity selected to maximize sensitivity of the electrical conductivity detector to change in electrical conductivity of the fluid in the separation vessel, while the power unit used for separating fluids within the vessel has a capacity selected to maximize separation efficiency of the vessel. In some cases, the power unit used for the electrical conductivity detector may have a capacity less than the capacity of the power unit used for separating fluids, for example 90% less. In some cases, the power unit used for the electrical conductivity detector operates at an average voltage of 1-3 kV.

The electrical conductivity detector is located within the separation vessel at a location selected to detect encroachment of a conductive fluid before the conductive fluid comes into contact with the array of electrodes. For example, where the array of electrodes extends from a peripheral area of the separation vessel toward a central area of the vessel, the electrical conductivity detector, or a portion thereof, may extend further toward the central area of the vessel than the array of electrodes. The electrical conductivity detector may include a plurality of electrodes located at different locations within the vessel. The electrodes of the electrical conductivity detector may have a uniform or non-uniform distribution, and may have different dimensions or be disposed at different elevations within the separation vessel.

The electrodes used for the conductivity detector may be simple wires immersed in the fluid of the vessel, or rods, plates, or other convenient structures. The electrodes may be electrically connected such that the entire conductivity detector is at substantially constant electric potential. Alternatively, circuitry can be used to influence how the conductivity detector represents changing electrical conductivity in the fluid of the vessel.

At 608, the power unit powering the electrical conductivity detector is monitored for operating changes that can be related to a change in conductivity near the conductivity detector. The changes can come in the form of voltage changes, current changes, and/or impedance changes. A controller can be used to analyze signals from sensors attached to the power unit powering the electrical conductivity detector. The controller may comprise a machine learning system to maximize detection of conductivity excursions.

At 610, if a rise in electrical conductivity is detected, for example based on a time-average current, voltage, or impedance measurement performed on the circuit linking the electrical conductivity detector to the power unit, a control action is taken to decrease conductivity in the vicinity of the electrical conductivity detector. The control action may move a region of higher conductivity fluid further from the electrical conductivity detector, and by extension from the array of electrodes used to create the electric field within the separation vessel. Such actions can include adjusting flow rates of inlet or outlet streams, adjusting chemical or electrical treatments designed to reduce or control the size of any interface regions or stable mixtures within the vessel, and adjusting operating temperatures and pressures.

Electrical separators employing detection electrodes to detect encroachment of conductive fluids upon electrodes disposed within the separation vessel are described herein. The embodiments described herein feature multiple detection electrodes. It should be noted that a single detection electrode can be used to detect increasing conductivity at a location within a separation vessel to detect encroachment of conductive fluids. The detection electrodes shown herein are also depicted as being disposed from a top or upper portion of the separation vessel, but detection electrodes can be deployed from any location to any location within the vessel, depending on the needs of individual processes. The electrodes can be nothing more than insulated wires routed through the vessel interior, perhaps along a support made of a suitable material, to a desired location.

Figure 7:
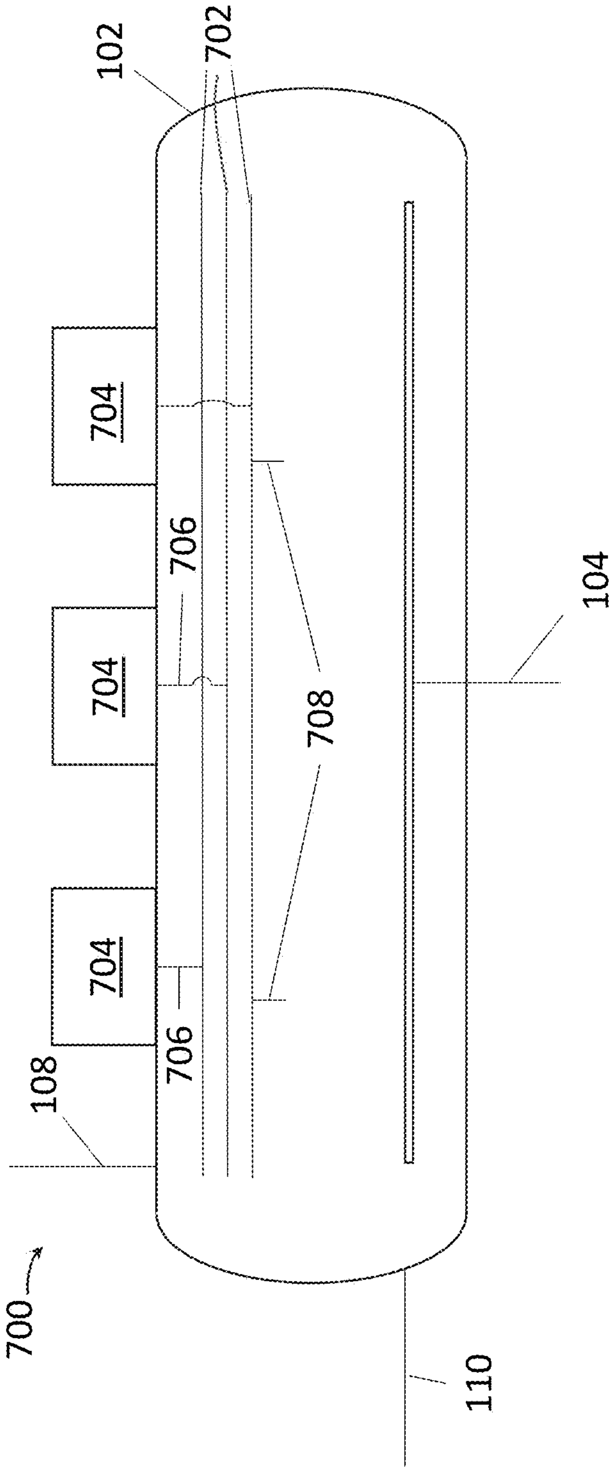
FIG. 7 is a schematic internal side view of a separator according to another embodiment.

FIG. 7 is a schematic internal side view of a separator 700 according to another embodiment. The separator 700 has an electric field assembly comprising a plurality of electrodes 702, in this case three horizontal electrodes. These may be wires, plates, screens, meshes, or other structures. Each of the electrodes 702 is coupled to a dedicated power unit 704 by a dedicated circuit 706. The separator 700 has two conductivity detectors 708, in this case two detector electrodes attached to the electrode 702 with lowest elevation within the vessel 102, that extend downward away from the electric field assembly to a position enabling the conductivity detectors 708 to detect fluid conductivity changes before the fluid conductivity negatively affects the electric field assembly and one or more of the power units 704.

All the electric field assemblies described herein are disposed within a separation vessel and extend from a wall of the vessel a first distance in a first direction. The conductivity detectors described herein are also disposed within in the separation vessel and extend from the wall of the vessel a second distance in the first direction, the second distance being greater than the first distance. The first direction is a direction of a density-based separation force, such as gravitational or centrifugal force. It should be noted that while all the embodiment described herein rely on gravitational force as the density-based separation force, the concepts herein can be used in a centrifugal separator with electrical enhancement. The conductivity detectors are generally deployed to a location, in the direction of the separation force, that is beyond a furthest extent of the electric field assembly in that direction.

While the foregoing is directed to embodiments of the present invention, other and further embodiments of the present disclosure may be devised without departing from the basic scope thereof, and the scope thereof is determined by the claims that follow.

What is claimed is:

1. A method of separating phases of a multiphase fluid into two liquid phases, the method comprising:

providing the multiphase fluid to a separation vessel having an electrode disposed in an interior of the vessel;

applying power to the electrode within the vessel to create an electric field within the multiphase fluid;

disposing an electrical conductivity detector within the interior of the vessel at a location selected to enable detection of an electrical conductivity of a fluid portion in the separation vessel before the fluid portion affects the electrode;

applying power to the electrical conductivity detector using a power unit electrically coupled to the electrical conductivity detector;

detecting a change in electrical conductivity of the fluid portion near the electrical conductivity detector based in part on operating changes in the power unit; and responsive to detecting the change in electrical conductivity of the fluid portion near the electrical conductivity detector, controlling operation of the separation vessel or the electrode to reduce electrical conductivity of the fluid portion near the electrical conductivity detector.

2. The method of claim 1, wherein detecting the change in electrical conductivity of the fluid portion near the electrical conductivity detector based in part on operating changes in the power unit includes analyzing signals generated by a sensor attached to the power unit.

3. The method of claim 1, wherein the operating changes in the power unit include voltage changes in the power unit.

4. The method of claim 1, wherein the operating changes in the power unit include current changes in the power unit.

5. The method of claim 1, wherein the operating changes in the power unit include impedance changes in the power unit.

6. The method of claim 1, wherein detecting the change in electrical conductivity of fluid near the electrical conductivity detector based in part on operating changes in the power unit includes using a machine learning system.

7. The method of claim 1, wherein the power unit is a first power unit, wherein applying power to the electrode within the vessel to create an electric field within the multiphase fluid includes using a second power unit.

8. A separator, comprising:

a separation vessel;

an electrode disposed in an interior of the separation vessel, the electrode configured to generate an electric field;

an electrical conductivity detector within the interior of the vessel at a location selected to enable detection of an electrical conductivity of a fluid portion in the separation vessel before the fluid portion affects the electrode;

a power unit electrically coupled to the electrical conductivity detector, the power unit configured to apply power to the electrical conductivity detector;

a sensor electrically coupled to the power unit, the sensor configured to sense an electrical characteristic of the power unit; and a controller configured to:

detect a change in electrical conductivity of the fluid portion near the electrical conductivity detector based in part on a change in the electrical characteristic of the power unit; and responsive to detecting the change in electrical conductivity of the fluid portion near the electrical conductivity detector, control operation of the separation vessel or the electrode to reduce electrical conductivity of the fluid portion near the electrical conductivity detector.

9. The separator of claim 8, wherein the sensor is an impedance sensor and the electrical characteristic of the power unit is an impedance associated with the power unit.

10. The separator of claim 8, wherein the sensor is a voltage sensor and the electrical characteristic of the power unit is a voltage associated with the power unit.

11. The separator of claim 8, wherein the sensor is a current sensor and the electrical characteristic of the power unit is a current associated with the power unit.

12. The separator of claim 8, further comprising a second power unit electrically coupled to the electrode, the second power unit configured to apply power to the electrode.

13. The separator of claim 8, wherein the power unit is electrically coupled to the electrode, the power unit configured to apply power to the electrode.

* * * * *